Dec. 17, 1946.  J. D. DANFORTH  2,412,675
ISOMERIZATION OF SATURATED HYDROCARBONS
Filed Feb. 11, 1943
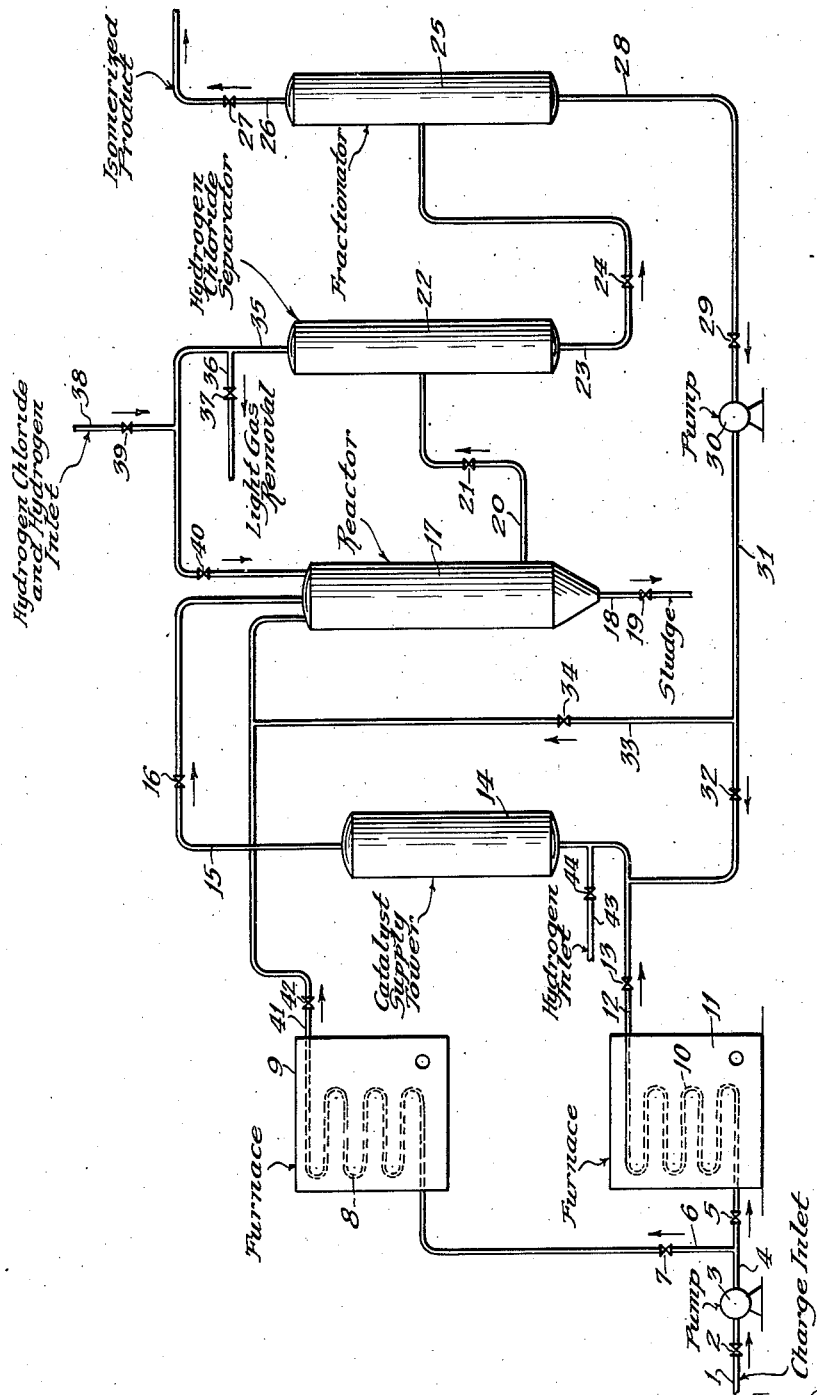
Inventor:
Joseph D. Danforth
By Lee J. Gary
Attorney Patented Dec. 17, 1946

2,412,675

UNITED STATES PATENT OFFICE 2,412,675

ISOMERIZATION OF SATURATED HYDROCARBONS

Joseph D. Danforth, Riverside, Ill., assignor to Universal Oil Products Company, Chicago, Ill., a corporation of Delaware Application February 11, 1943, Serial No. 475,515

8 Claims. (Cl. 260—683.5)

This application is a continuation-in-part of my co-pending application Serial No. 370,323, filed December 16, 1940.

The present invention relates to the catalytic isomerization of saturated hydrocarbons such as butane, pentane, hexane, naphthenes such as cyclohexane or hydrocarbon fractions boiling within the gasoline range containing substantial quantities of these hydrocarbons. More specifically it deals with an improved isomerization process wherein the catalyst in the reaction zone is constantly being renewed by the introduction of fresh catalyst to said zone in solution in at least a portion of the hydrocarbon charge.

The previously proposed processes for the isomerization of saturated hydrocarbons with catalysts of the Friedel-Crafts type generally one or more halides of aluminum, zirconium, zinc, iron and the like, in the presence of hydrogen halides consisted of passing the hydrocarbons and hydrogen halide through a fixed bed of granular catalysts either alone or deposited on solid supports under conditions of temperature and pressure such that a portion of saturated hydrocarbons are converted to isomers thereof. One of the most serious disadvantages in these processes is the decrease in catalyst activity during the course of reaction due to depletion or contamination of the active catalytic materials present. Due to the continual change in catalyst activity during the operation, it is necessary to vary the operating conditions to compensate for losses in activity in order to maintain a suitable conversion of the saturated hydrocarbons to isomers thereof. This variation in operating conditions introduces additional difficulties and complications in the operation and results in a decrease in the commercial applicability of the proposed isomerization processes. In spite of the adjustment of operating conditions, the catalyst activity decreases to an extent where it is no longer commercially feasible to continue the operation which necessitates discontinuing the isomerization and replenishing the catalyst in the reaction zone. Various modifications of operating procedure, such as the use of a plurality of reaction zones have been proposed but these modifications, multiply to a considerable extent the operating difficulties encountered.

The present invention provides an improved method wherein a more continuous and substantially more economical process than has been hitherto possible is obtained.

In accordance with the present invention at least a part of the saturated hydrocarbon charge in substantially liquid phase is passed through a contact zone containing a metallic halide of the Friedel-Crafts type under conditions of temperature and pressure such that an amount of catalyst adequate to maintain the desired catalyst concentration in a subsequent reaction zone is dissolved in the liquid hydrocarbon. The catalyst containing solution from said contact zone is reacted in the presence of a hydrogen halide in a reaction zone maintained under conditions of temperature and pressure sufficient to convert a substantial portion of the saturated hydrocarbons to isomers thereof. The desired concentration is maintained in said reaction zone by continuously supplying thereto small increments of fresh catalyst from a bulk supply in the first contact zone in solution in at least a portion of the saturated hydrocarbon charge.

To obtain satisfactory results in the present invention it is essential that some means be utilized to retain in the reaction zone at least a portion of the catalyst being introduced into said zone in solution in the hydrocarbon charge. Suitable materials for this retention of the catalyst may comprise granular particles or shaped bodies of solid materials such as rachig rings, burl saddles, crushed fire brick and other well known packing materials.

During the initial period of the operation only a small portion of the catalyst entering the reaction zone is removed in the reaction products from said zone, the remaining portion adheres to the surfaces of the packing materials disposed within the zone. As the operation continues, the packing material will become saturated and a point will be reached where the amount of catalyst being removed from the reaction zone either in the reaction products as free catalyst or combined with a portion of the hydrocarbons is substantially equivalent to the amount being introduced into said zone in solution in the hydrocarbon charge. After the establishment of this equilibrium the catalyst concentration will be maintained substantially constant throughout the remainder of the operation. This catalyst concentration will be in substantial excess of that in the incoming catalyst containing solution due primarily to the retention of a portion of the catalyst by the packing materials in the reaction zone.

In one specific embodiment, the present invention relates to a process for isomerizing saturated hydrocarbons which comprises passing a stream of said saturated hydrocarbon in substantially liquid phase through and in relative movement to a bulk supply of metallic halide catalyst of the Friedel-Crafts type in a first zone under conditions such that only a portion of said catalyst is dissolved in said liquid hydrocarbon stream, commingling the catalyst containing effluent from said first zone with a hydrogen halide within a second zone maintained under isomerizing conditions and converting a substantial portion of said saturated hydrocarbons to isomers thereof in said second zone in the presence of the catalyst supplied thereto from the first zone.

I have discovered that by introducing the catalyst into the reaction zone in solution in at least a portion of the hydrocarbon charge the desired amount of catalyst may be transferred from the bulk supply to the reaction chamber at comparatively low temperatures. If, on the other hand, vapors of the hydrocarbon charge are used as a carrying medium, higher temperatures must be utilized to carry an equivalent amount of catalyst. The use of higher temperatures causes considerable decomposition of the charging stock in the catalyst supply zone resulting in increased catalyst consumption due to the formation of hydrocarbon catalyst complexes by the reaction of the catalyst with the decomposition products.

Utilization of liquid phase transfer also provides a simple method of regulating the rate of catalyst introduction. This rate will be primarily dependent upon the temperature in the supply zone which will control the solubility of the catalyst in the hydrocarbon charge. With vapor phase transfer, the rate of catalyst introduction will be dependent not only on the temperature but also on the pressure which considerably increases complexity of the operation.

Further features and advantages of the present invention will be evident from a consideration of the following description of the accompanying diagrammatic drawing of one type of apparatus in which the objects of the invention may be accomplished.

For simplification such units as heat exchangers, condensers, reboilers, etc., which are not essential to the understanding of the description have been eliminated.

Referring to the drawing, a saturated hydrocarbon, for example, normal butane, is introduced through line 1 containing valve 2 into pump 3 which discharges through line 4 containing valve 5 into heating coil 10 disposed within furnace 11. The heat absorbed by the butane during its passage through heating coil 10 is sufficient to compensate for any losses in heat during the transfer of the heated butane stream through line 12 containing valve 13 and still maintain the desired temperature in catalyst supply tower 14. The temperature within tower 14 is dependent upon the particular isomerization catalyst used and the solubility of the catalyst in the hydrocarbon. In the broader aspects of the invention, this temperature is within the range of about 100 to about 350° F. However, narrow ranges are applicable to the particular isomerization catalyst utilized for example, a temperature range of approximately 140 to 250° F. is desirable when employing an aluminum chloride while with other metallic halides, such as zirconium chloride and zinc chloride, a higher temperature up to approximately 350° F. may be used. The pressure in tower 14 will vary with the temperature but it is essential that a liquid phase be maintained within said tower.

The catalyst disposed within tower 14 may comprise aluminum chloride, zinc chloride, zirconium chloride either alone or in admixture with one another or any other well-know Friedel-Crafts type isomerizing catalyst which possesses sufficient solubility in the hydrocarbons being charged under the particular conditions of temperature and pressure maintained in tower 14 to dissolve an adequate amount to maintain the desired catalyst concentration in the subsequent reactor.

For a completely continuous operation, it is desirable to have a second tower similar to tower 14 through which the hydrocarbon stream may be converted while tower 14 is being refilled with catalysts. The effluent solution in tower 14 is directed through line 15 containing valve 16 into reactor 17 wherein it is commingled with a hydrogen halide obtained as hereinafter set forth. The temperatures and pressures maintained in reactor 17 are dependent upon the hydrocarbon and catalyst being utilized in the operation. When utilizing aluminum chloride as the isomerizing catalyst this temperature will be ordinarily within the approximate range of 50 to 300° F. With various other catalysts good conversions are obtained up to temperatures of about 400° F. The pressure is dependent upon the hydrocarbon phase desired in reactor 17. I have found that the isomerization reaction will proceed satisfactorily in the liquid, mixed or vapor phase.

In the preferred mode of operation, reactor 17 is packed with any of the well-known packing materials such as rachig rings, berl saddles, crushed fire-brick, etc. This packing provides a surface upon which a portion of the catalyst may deposit so that at all times during the operation the amount of catalyst present in reactor 17 is greater than that being introduced in the hydrocarbon stream from catalyst supply tower 14.

As a specific modification of the operation, a portion of the butane leaving pump 3 may be directed to line 6 containing valve 7 into heating coil 8 disposed within furnace 9 wherein it is heated to the desired temperature and transferred through line 41 containing valve 42 into reactor 17. This method of operation increases to a considerable extent the flexibility of the regulation of the temperature and catalyst concentration within reactor 17. The amount of catalyst removed from tower 14 is dependent primarily upon the solubility of the catalyst in the hydrocarbon and the amount of hydrocarbon passed through said tower per unit time. It is obvious that by varying the proportions of the two streams entering furnaces 9 and 11, respectively, the amount of catalyst carried into reactor 17 may be varied while maintaining a constant charge of hydrocarbons to said zone. The hydrocarbon stream passing through furnace 9 may be heated to a temperature substantially in excess of that desired in catalyst tower 14 and can be utilized as a heat carrying medium to produce the desired temperature when commingled with the catalyst containing stream from tower 14 and the added hydrogen halide within reactor 17. Further advantages are obtained in that this method of operating obviates the necessity by contacting the bulk supply of catalyst with the entire charging stock. This is extremely important in the event that the charging stock contains impurities which may poison or consume the catalyst.

During the reaction a minor amount of the hydrocarbon reacts with the catalyst to form a complex commonly termed sludge which is withdrawn from reactor 17 through line 18 containing valve 19. The remaining reaction products are directed through line 20 containing valve 21 into hydrogen chloride separator 22 wherein the hydrogen chloride and light hydrocarbon gases, such as ethane and propane formed during the reaction are separated from the isobutane and unconverted normal butane. The hydrogen chloride and a portion of the light hydrocarbon gases are recycled through line 35 containing valve 40 into reactor 17. The original charge of hydrogen chloride and any additional make-up necessary during the operation is introduced through line 38 containing valve 39 into recycle line 35. The concentration of hydrogen chloride in reactor 17 is dependent upon the particular conversion temperature and hydrocarbon charge, but is ordinarily within the approximate range of 1 to 40 mol per cent of the hydrocarbon and preferably within the approximate range of 5 to 25 mol per cent.

I have found that the addition of hydrogen in some instances increases the efficiency of the operation. This hydrogen may be introduced along with the hydrogen chloride through line 38 containing valve 39 into recycle line 35. The amount of hydrogen introduced will usually be less than approximately 30 mol per cent of the hydrocarbon charge. Further addition of hydrogen may be made through line 43 containing valve 44 into catalyst supply tower 14. To avoid a build-up of light hydrocarbons, such as methane, ethane and propane in the system, a portion is periodically withdrawn through line 36 containing valve 37 and the saturated gases recovered as a product of the reaction after the removal of the hydrogen chloride therefrom.

The isobutane-normal butane stream is directed from separator 22 through line 23 containing valve 24 into fractionator 25 wherein the isobutane is separated from the unconverted normal butane. The separated isobutane is withdrawn through line 26 containing valve 27 and recovered as a product of the reaction. The unconverted normal butane is directed through line 28 containing valve 29 into pump 30 which discharges through line 31 containing valve 32 into line 12. A portion of the recycle normal butane may be directed through line 33 containing valve 34 into reactor 17 along with the heated butane stream from furnace 9.

The following examples are presented as being characteristic of the results obtained when operating in accordance with the present invention, although it is not intended to limit the generally broad scope of the invention to the specific conditions presented in the examples.

Example 1

A stream of normal butane heated to a temperature of 180° F. was introduced into the bottom of a catalyst tower containing granular aluminum chloride. The tower was maintained at a pressure of 250 pounds per square inch to insure the presence of a liquid phase of normal butane. The effluent solution having an aluminum chloride concentration of 1.7 pounds per barrel of charge was commingled with a second stream of heated butane and the resulting mixture having a temperature of 220° F. introduced into a packed reaction zone. The butane stream containing aluminum chloride dissolved therein amounted to about 47 per cent of the total mixture. Hydrogen chloride was introduced into the reaction zone in an amount equivalent to about 11.7 mol per cent of the butane charge. Approximately 40.3 per cent by volume of isobutane was formed during the passage of the normal butane through the reaction zone.

Example 2

A normal pentane fraction heated to 170° F. was introduced into a catalyst pickup chamber containing a bed of granular aluminum chloride. The chamber was maintained under a pressure of 260 pounds per square inch. Hydrogen was introduced to the pickup chamber in an amount equivalent to 10 mol per cent of the hydrocarbon charge. The effluent liquid having an aluminum chloride concentration of about 1.1 pounds of aluminum chloride per barrel of charge was commingled with hydrogen chloride in a packed reaction zone maintained at a temperature of 250° F. and under a pressure of 250 pounds per square inch. The hydrogen chloride concentration in the reaction zone was 10 mol per cent of the pentane charge. A conversion of about 45.5 per cent by volume of the charge to isopentane was obtained during the passage of the normal pentane through the packed reaction zone.

Example 3

A 39 octane number acid-treated hexane fraction was introduced into a catalyst pickup chamber containing a bed of granular aluminum chloride. The catalyst pickup chamber was maintained at a temperature of 170° F. and under a pressure of 500 pounds per square inch. The effluent liquid from the pickup chamber having an aluminum chloride concentration of about 1 pound per barrel of hexane charge was commingled with about 10 mol per cent of hydrogen chloride in a packed reaction tower. The octane number of the product was about 72.3, an improvement of 33.3 octane numbers over the charge.

I claim as my invention:

1. An isomerization process which comprises subjecting an isomerizable saturated hydrocarbon to catalytic isomerization in a reaction zone containing a solid packing material and maintained under isomerizing conditions, maintaining in a catalyst supply zone a bed of fresh Friedel-Crafts metal halide catalyst not previously used in said reaction zone, heating a liquid stream of said isomerizable saturated hydrocarbon to a temperature sufficient to dissolve a portion of said catalyst, thereafter passing the heated stream in substantially liquid phase through said bed in the supply zone and dissolving a portion of the bed in the liquid stream, introducing the resultant catalyst-hydrocarbon solution to the reaction zone and depositing catalyst from the solution onto said solid packing material to maintain in the reaction zone a catalyst concentration substantially greater than that of the solution being introduced to the reaction zone, effecting said catalytic isomerization of the saturated hydrocarbon in the presence of the catalyst thus retained in the reaction zone, substantially all of the requisite quantity of fresh metal halide catalyst for effecting said catalytic isomerization being supplied to the reaction zone in said solution, removing resultant reaction products from the reaction zone and supplying the same to a fractionating zone without passage thereof through the catalyst supply zone, and fractionating the products in the fractionating zone to recover the isomerized hydrocarbon therefrom.

2. A process for isomerizing an isomerizable saturated hydrocarbon which comprises heating a liquid stream comprising a portion of said hydrocarbon and then passing the heated stream in substantially liquid phase through a bed of fresh Friedel-Crafts metal halide catalyst at a temperature sufficient to dissolve a portion of said bed, introducing the resultant catalyst-hydrocarbon solution to a reaction zone containing a solid packing material, separately heating a second portion of said hydrocarbon to a higher temperature than the first-mentioned portion and then introducing the same directly to the reaction zone, the amount and temperature of said separately heated second portion being sufficient to maintain an isomerizing temperature in the reaction zone, depositing catalyst from said solution onto said solid packing material to maintain in the reaction zone a catalyst concentration substantially greater than that of said solution, effecting substantial isomerization of said portions of the hydrocarbon in the presence of the catalyst thus retained in the reaction zone, substantially all of the requisite quantity of fresh metal halide catalyst for effecting said catalytic isomerization being supplied to the reaction zone in said solution, removing resultant reaction products from said zone and recovering the isomerized hydrocarbon therefrom.

3. An isomerization process which comprises subjecting an isomerizable saturated hydrocarbon to catalytic isomerization in the presence of a hydrogen halide in a reaction zone containing a solid packing material and maintained under isomerizing conditions, maintaining in a catalyst supply zone a bed of fresh aluminum halide catalyst not previously used in said reaction zone, heating a liquid stream of said isomerizable saturated hydrocarbon to a temperature sufficient to dissolve a portion of said aluminum halide, thereafter passing the heated stream in substantially liquid phase through said bed in the supply zone and dissolving a portion of the bed in the liquid stream, introducing the resultant aluminum halide-hydrocarbon solution to the reaction zone and depositing aluminum halide catalyst from the solution onto said solid packing material to maintain in the reaction zone an aluminum halide concentration substantially greater than that of the solution being introduced to the reaction zone, effecting said catalytic isomerization of the saturated hydrocarbon in the presence of the aluminum halide catalyst thus retained in the reaction zone, substantially all of the requisite quantity of fresh aluminum halide catalyst for effecting said catalytic isomerization being supplied to the reaction zone in said solution, removing resultant reaction products from the reaction zone and supplying the same to a fractionating zone without passage thereof through the catalyst supply zone, and fractionating the products in the fractionating zone to recover the isomerized hydrocarbon therefrom.

4. An isomerization process which comprises subjecting an isomerizable saturated hydrocarbon to catalytic isomerization in the presence of hydrogen chloride in a reaction zone containing a solid packing material and maintained under isomerizing conditions, maintaining in a catalyst supply zone a bed of fresh aluminum chloride catalyst not previously used in said reaction zone, heating a liquid stream of said isomerizable saturated hydrocarbon to a temperature sufficient to dissolve aluminum chloride therein, thereafter passing the heated stream in substantially liquid phase through said bed in the supply zone and dissolving a portion of the bed in the liquid stream, introducing the resultant aluminum chloride-hydrocarbon solution to the reaction zone and depositing aluminum chloride catalyst from the solution onto said solid packing material to maintain in the reaction zone an aluminum chloride concentration substantially greater than that of the solution being introduced to the reaction zone, effecting said catalytic isomerization of the saturated hydrocarbon in the presence of the aluminum chloride catalyst thus retained in the reaction zone, substantially all of the requisite quantity of fresh aluminum chloride catalyst for effecting said catalytic isomerization being supplied to the reaction zone in said solution, removing resultant reaction products from the reaction zone and supplying the same to a fractionating zone without passage thereof through the catalyst supply zone, and fractionating the products in the fractionating zone to recover the isomerized hydrocarbon therefrom.

5. A process for isomerizing an isomerizable saturated hydrocarbon which comprises heating a liquid stream comprising a portion of said hydrocarbon and then passing the heated stream in substantially liquid phase through a bed of fresh aluminum halide at a temperature sufficient to dissolve a portion of said bed, introducing the resultant aluminum halide-hydrocarbon solution and a hydrogen halide to a reaction zone containing a solid packing material, separately heating a second portion of said hydrocarbon to a higher temperature than the first-mentioned portion and then introducing the same directly to the reaction zone, the amount and temperature of said separately heated second portion being sufficient to maintain an isomerizing temperature in the reaction zone, depositing aluminum halide catalyst from said solution onto said solid packing material to maintain in the reaction zone an aluminum halide concentration substantially greater than that of said solution, effecting substantial isomerization of said portions of the hydrocarbon in the presence of the aluminum halide catalyst thus retained in the reaction zone, substantially all of the requisite quantity of fresh aluminum halide catalyst for effecting said catalytic isomerization being supplied to the reaction zone in said solution, removing resultant reaction products from said zone and recovering the isomerized hydrocarbon therefrom.

6. A process for isomerizing an isomerizable saturated hydrocarbon which comprises heating a liquid stream comprising a portion of said hydrocarbon to a temperature sufficient to dissolve aluminum chloride therein and then passing the heated stream in substantially liquid phase through a bed of fresh aluminum chloride to dissolve a portion of said bed, introducing the resultant aluminum chloride-hydrocarbon solution and hydrogen chloride to a reaction zone containing a solid packing material, separately heating a second portion of said hydrocarbon to a higher temperature than the first-mentioned portion and then introducing the same directly to the reaction zone, the amount and temperature of said separately heated second portion being sufficient to maintain an isomerizing temperature in the reaction zone, depositing aluminum chloride catalyst from said solution onto said solid packing material to maintain in the reaction zone an aluminum chloride concentration substantially greater than that of said solution, effecting substantial isomerization of said portions of the hydrocarbon in the presence of the aluminum chloride catalyst thus retained in the reaction zone, substantially all of the requisite quantity of fresh aluminum chloride catalyst for effecting said catalytic isomerization being supplied to the reaction zone in said solution, removing resultant reaction products from said zone and recovering the isomerized hydrocarbon therefrom.

7. The process as defined in claim 3 further characterized in that said saturated hydrocarbon is a normal paraffin.

8. The process as defined in claim 3 further characterized in that said saturated hydrocarbon is normal butane.

JOSEPH D. DANFORTH.